US012623705B2

(12) United States Patent
Mogensen

(10) Patent No.: US 12,623,705 B2
(45) Date of Patent: May 12, 2026

(54) LOAD CARRIER WITH STORAGE FACILITY IN THE BASE FOR STORING COLUMNS

(71) Applicant: UNI-TROLL EUROPE APS, Tommerup (DK)

(72) Inventor: Erling Mogensen, Middelfart (DK)

(73) Assignee: UNI-TROLL EUROPE APS (DK)

( * ) Notice: Subject to any disclaimer, the term of this patent is extended or adjusted under 35 U.S.C. 154(b) by 249 days.

(21) Appl. No.: 18/557,019

(22) PCT Filed: Apr. 21, 2022

(86) PCT No.: PCT/DK2022/050080
§ 371 (c)(1),
(2) Date: Oct. 24, 2023

(87) PCT Pub. No.: WO2022/223088
PCT Pub. Date: Oct. 27, 2022

(65) Prior Publication Data
US 2024/0217570 A1        Jul. 4, 2024

(30) Foreign Application Priority Data

Apr. 23, 2021    (DK) .............................. PA202170185

(51) Int. Cl.
*B62B 3/02*        (2006.01)
*B62B 3/16*        (2006.01)

(52) U.S. Cl.
CPC .................. *B62B 3/02* (2013.01); *B62B 3/16* (2013.01); *B62B 2206/06* (2013.01); *B62B 2301/044* (2013.01)

(58) Field of Classification Search
CPC .... B62B 3/02; B62B 3/16; B62B 3/14; B62B 3/027; B62B 2206/06; B62B 2301/044
See application file for complete search history.

(56) References Cited

U.S. PATENT DOCUMENTS 2,840,384 A *    6/1958    Bard ......................... B62B 3/02
                                                                 280/79.5
3,887,207 A       6/1975    Gotsch
                        (Continued)

FOREIGN PATENT DOCUMENTS

CN        203793396 U      8/2014
DE           2800575 A1     7/1978
                        (Continued)

OTHER PUBLICATIONS

International Preliminary Report on Patentability in International Appln. No. PCT/DK2022/050080, dated Oct. 24, 2023, 6 pages.
                        (Continued)

*Primary Examiner* — John D Walters
(74) *Attorney, Agent, or Firm* — Winthrop & Weinstine, P.A.

(57)        ABSTRACT
A load carrier comprising a rectangular base frame and a plurality of support bars and/or plate portions surround by a frame portion is provided. The support bars may be transverse or longitudinal. Wheels may be provided on a bottom portion of the base frame. Connecting pieces may be provided on the base frame, for example at corners of the base frame, for receiving columns during use of the load carrier. Substantially U-shaped members may be provided on the support bars for receiving the columns when the load carrier is not in use. The substantially U-shaped members may have an upwardly open channel having sides and a base.

16 Claims, 5 Drawing Sheets

(56)                    References Cited

U.S. PATENT DOCUMENTS

| | | | | | |
|---|---|---|---|---|---|
| 5,249,823 | A | * | 10/1993 | McCoy | ..................... B62B 3/02 |
| | | | | | 280/87.01 |
| 7,066,477 | B2 | * | 6/2006 | Dubois | ..................... B62B 3/16 |
| | | | | | 280/166 |
| 12,215,735 | B2 | * | 2/2025 | Mogensen | .............. B62B 3/005 |

FOREIGN PATENT DOCUMENTS

| | | | |
|---|---|---|---|
| DK | 201670567 | A1 | 2/2018 |
| EP | 3006303 | A1 | 4/2016 |
| JP | 2016168868 | A | 9/2016 |
| WO | 2012001217 | A1 | 1/2012 |
| WO | 2015018166 | A1 | 2/2015 |
| WO | 2016048153 | A1 | 3/2016 |
| WO | 2020135910 | A1 | 7/2020 |

OTHER PUBLICATIONS

Search Report in Danish Application. No. PA 2021 70185, dated Nov. 5, 2021, 8 pages (with English machine translation).

* cited by examiner

LOAD CARRIER WITH STORAGE FACILITY IN THE BASE FOR STORING COLUMNS

CROSS-REFERENCE TO RELATED APPLICATIONS

This application is a National Stage Application of PCT/DK2022/050080, filed on 21 Apr. 2022, which claims benefit of Application No. PA202170185, filed on 23 Apr. 2021 in Denmark and which applications are incorporated herein by reference. A claim of priority to all, to the extent appropriate, is made.

FIELD OF THE INVENTION

The present invention relates to a load carrier comprising a rectangular base frame and a plurality of support bars and/or plate portions surround by a frame portion is provided. The support bars may be transverse or longitudinal. Wheels may be provided on a bottom portion of the base frame. Connecting pieces may be provided on the base frame, for example at corners of the base frame, for receiving columns during use of the load carrier. Substantially U-shaped members may be provided on the support bars for receiving the columns when the load carrier is not in use. The substantially U-shaped members may have an upwardly open channel having sides and a base.

BACKGROUND OF THE INVENTION

Load carriers are well-known in the art. Such load carriers are for transport of plants and flowers, fruit and vegetables, or other goods or products and are commonly used in retailing.

Existing load carrier have a base frame that forms a large open space, on which columns can be stored. The columns can be dismounted from the load carrier before empty return transport The columns are usually manufactured in shorter parts that can be combined to a longer column. Normally, a column is combined of two or more parts to obtain a height corresponding to a cargo compartment during transport.

Such load carrier, or cart, is often provided with a set of front wheels and a set of rear wheels mounted on the bottom face of a base frame. Vertical columns are provided extending upwardly from corners of the base frame. One or more shelves are arranged between the columns to support the load of the cart. The shelves are usually connected to each of the vertical columns by means of hooks placed in the corners of the shelves. The hooks are configured to engage with slits placed at suitable intervals in the longitudinal direction of the columns, and the shelves can hereby be mounted or dismounted, moved and/or removed, depending on the situation or use. Because the shelves are removable, the load carriers take up less space during return transport in empty condition.

A problem with prior art load carriers is that when the load carrier is to be returned empty, and the columns are arranged in the cavity of the base. There is no specificity to direction of the columns in the cavity of the base and the columns are randomly placed, for example such that they are not oriented in the same direction. Moreover, handling of the load carrier, when it is run over a foundation that is not completely plane, will lead to a great deal of unwanted noise.

Thus, there is a need in the art for a load carrier providing arrangement and storage of the columns during transport in an empty condition such that the columns are not placed randomly, and so that the columns and the base frame do not make unnecessary noise

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

A load carrier is provided that takes up less space during transport when it is returned empty, is easy to disassemble and assemble, and is noise-dampened when run over a foundation or transported in another manner.

In one or more embodiments, the load carrier comprises a base frame having transverse longitudinal bars and/or plate portions. One or more substantially U-shaped members (also referred to as members) are coupled to the bars and/or plate portions. The U-shaped members comprise an upwardly open channel having sides and a base. The load carrier includes connecting pieces for attachment of columns. These may be provided at corners of the base frame.

These U-shaped members form storage facilities for storage of the columns when the columns have been disassembled from connecting pieces. The U-shaped members receive the columns in a secure and defined position relative to the base frame. In such position, noise due to movement of the columns during transport of the load carrier is reduced.

The defined position of the columns in the U-shaped members enables automation of laying down and lifting out, as well as assembly and disassembly of, the columns. For example, robot technology or another form of automated gripper arms may be used to assemble, disassemble, and move the columns.

In one embodiment, one or more protrusions may be provided along the sides of the members, extending into the channel. These may be referred to as side protrusions. The protrusions can retain a column that is dimensioned such that it fits loosely into the member. More specifically, the protrusions apply a clamping force on such a column. By clamping a column in position in the U-shaped member, noise is reduced during transport and handling of the load carrier. At the same time, a distance between the sides of the members and the sides or edges of the column is established, which also reduces noise.

In one embodiment, a protrusion is formed on the base of the U-shaped member, extending upwardly therefrom. This may be referred to as a base protrusion. A distance between the member base and a column positioned in the member is thereby established. By establishing this distance, there is no contact along the entire length of the column between the member base and the one side of the column, which will dampen the noise.

In one embodiment, the protrusions of the sides of the member are provided in pairs substantially opposite each other. The protrusions may be arranged travelling slantwise, such that a lower end of the protrusions is closer to the nearest end of the member relative to an upper end of the protrusion. Using such an arrangement, it is possible to lay a column into the member without the end of the column coming into contact with an edge or a side of the protrusion, which is an advantage for example in connection with automated laying down of the columns.

In yet another embodiment, the protrusions are oblong.

In one embodiment, the base protrusion is arranged to rise level with a pair of side protrusions. In such embodiment, the base protrusion and side protrusions are placed close to each other, thereby offering the possibility of local well-defined retention.

In one embodiment, a set of side protrusions are arranged in an end area at both ends of the member. Using such arrangement, a column can be retained at least in an end area of the member. Additionally, one or more sets of side protrusions may be arranged in an area of the member that is not an end area.

In alternative embodiments, the U-shaped members may be dimensioned such that a column can fit directly in a U-shaped member without need for additional clamping force In one embodiment, the sides and/or base of the U-shaped member are provided with openings. This embodiment provides weight saving and reduces noise by enabling generated sound to escape through the openings such that the member will not form a kind of resonance box.

In one embodiment, the cross section of the members is trapezoid. A trapezoidal cross section may provide a higher strength to the member. In addition, because such member has slightly funnel-shaped sides, laying down of the member is made easier.

In one embodiment, the members are placed with their upwardly open channel travelling in the longitudinal direction of the base frame. A plurality of long column parts can be stored in such members.

In an alternative embodiment, the members are placed with their upwardly open channels travelling in the transverse direction of the base frame. A plurality of short column parts can be stored in such member. In general, more short column parts may be stored in an embodiment wherein the members are placed with their upwardly open channels travelling in the transverse direction long column parts can be stored in an embodiment wherein the members are placed with their upwardly open channels travelling in the longitudinal direction of the base frame.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The above and other features and advantages of the present invention will be evident to the person skilled in the art through the following detailed description of exemplary embodiments thereof with reference to the accompanying drawing, wherein.

DETAILED DESCRIPTION

Figure 1:
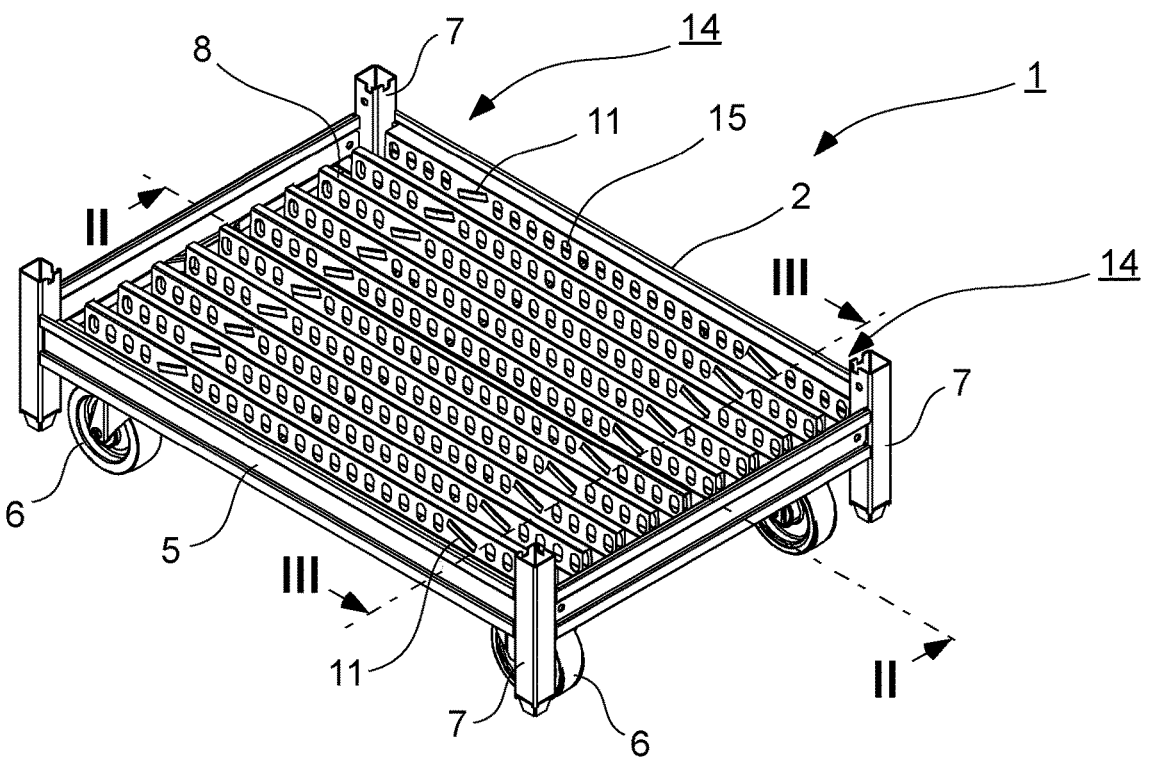
FIG. 1 illustrates a top perspective view of base frame of a load carrier, in accordance with one embodiment.

Various embodiments are described below with reference to the figures. Throughout the application the same reference numerals are used for identical or corresponding portions Similar elements will thus not be described in detail with regard to the description of each figure. The figures are intended for facilitating the description of the embodiments. The figures should not be seen as an exhaustive description of the present invention or as a limitation of the scope of the present invention. Moreover, an illustrated embodiment will not necessarily need to have all the shown aspects or advantages.

Load carriers, such as carts, are used for example for transport of plants and flowers as well as fruit and vegetables or other goods or products and are commonly used in retailing.

The present invention relates to a load carrier comprising a rectangular base frame and a plurality of support bars and/or plate portions surround by a frame portion is provided. The support bars may be transverse or longitudinal. Wheels may be provided on a bottom portion of the base frame. Connecting pieces may be provided on the base frame, for example at corners of the base frame, for receiving columns during use of the load carrier. Substantially U-shaped members may be provided on the support bars for receiving the columns when the load carrier is not in use. The substantially U-shaped members may have an upwardly open channel having sides and a base.

Various embodiments of such a load carrier are shown in the figures. The load carrier 1, or cart, comprises a base frame 2 with a plurality of support bars 3 and/or plate portions 4 surrounded by a frame portion 5. The base frame 2 may be rectangular. In general, the support bars 3 may be transversely or longitudinally disposed—and referred to as transverse support bars or longitudinal support bars respectively. Wheels 6 are provided on a bottom face of the base frame 2. In some embodiments, two sets of wheels 6 are provided with a wheel being positioned at each corner of the base frame 2. In some embodiments, more than two sets of wheels may be used. Connecting pieces 7 (or holders) are provided for attachment of a column 20. These may be provided at corners of the base frame 2.

One or more substantially U-shaped members 8 are provided on the support bars 3 and/or plate portions 4 of the base frame 2. Each U-shaped member has an upwardly open channel 12, the upwardly open channel 12 having sides 9 and a base 10. As shown in the figures, the plurality of substantially U-shaped members may be formed as a unitary structure.

One set of wheels 6 can be of the type that can pivot or swing about a vertical axis, so that the load carrier 1 can be controlled manually.

The members 8 can be attached to the support bars 3 and/or plate portions 4 of the base frame 2 using any suitable attachment means. For example, the members 8 can be attached to the support bars 3 using of gluing, welding, riveting, screws, or other types of fasteners. A noise-dampening material can be disposed between the support bars 3 and/or plate portions 4 of the base frame 2 and the members 8 in order to dampen noise between the member and the base frame.

In one embodiment of the load carrier 1, one or more side protuberances 11 may be provided along at least one of the internal sides 9 of the member 8. The protuberances 11 may be provided in one or more areas of the member 8 and extend into the open channel 12 of the member 8. The side protuberances 11 functionally reduce the width of the channel 12 of the member 8 to be filled by a column 20. The side protuberances 11 apply a clamping force on a column 20 arranged in the channel 12.

Figures 5, 6:
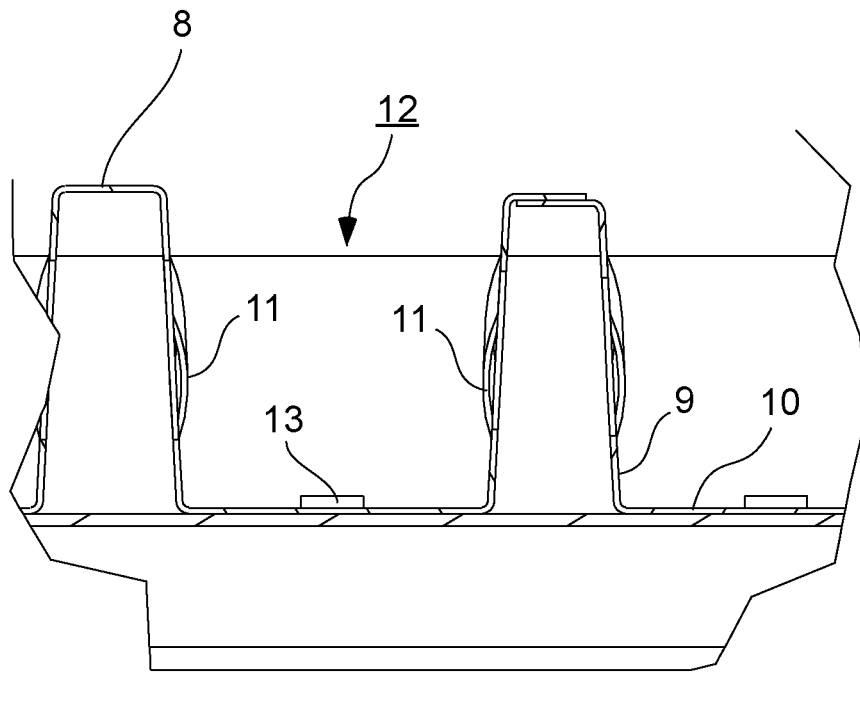
FIG. 5 illustrates a section of a member marked of the base frame of FIG. 3 as marked with the circle V.
FIG. 6 illustrates a section through a portion of a member with a column positioned therein, in accordance with one embodiment.

The side protuberances 11 can be formed by cams or elevations relative to the internal sides 9 of the member 8. The side protuberances may be resilient or springy. Alternatively, the side 9 of the member 8 can be resilient. When a column 20 is arranged in the channel 12 of a member 8, the side protuberances 11 press against the sides or edges of the column 20. An example of arrangement of a column 20 in the member 8 is illustrated in FIG. 6.

In one embodiment, one or more base protrusion 13 may be provided on the base 10 of the channel 12 of the member 8, rising from the member base 10. The base protrusion 13 can be formed by a cam or an elevation relative to the base 10 of the member 8. In some embodiments, a plurality of base protrusions 13 may be formed on the base 10 of the member 8.

In one embodiment, each column 20 comprises a tube having a rectangular cross section. In an alternative embodiment, each column 20 comprises a tube having a square cross section such that a clamping force is applied to a member 8 positioned in the channel 12 regardless of whether the column is rotated 90 degrees about its longitudinal axis. Alternatively, other cross sections may be used for the columns so long as the side protuberances 11 can clamp around the column 20 and thereby retain it in the channel 12 with the column 20 being supported by the base protrusion(s) 13.

The side protuberances 11 of the sides 9 of the member 8 can be arranged in pairs substantially opposite each other, and the protuberances 11 can be arranged travelling slantwise, such that a lower end of the side protuberances 11 is closer to the nearest end of the member 8 relative to an upper end of the side protuberance 11.

The load carrier 1 can also be provided with a base protrusion(s) 13 rising from base 10 of the member 8 to a level even with a bottom end of with a pair of protuberances 11 in the sides 9 of the member 8.

Figure 2:
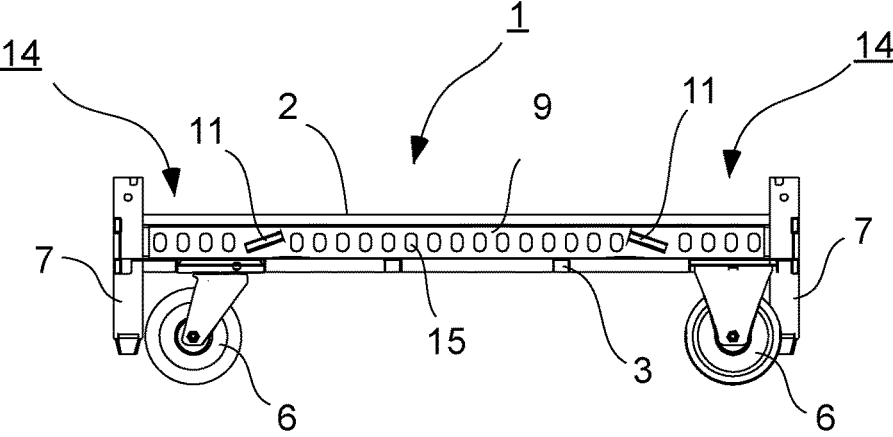
FIG. 2 illustrates a side view of a base frame of the load carrier of FIG. 1, shown in section II-II.
Figure 3:
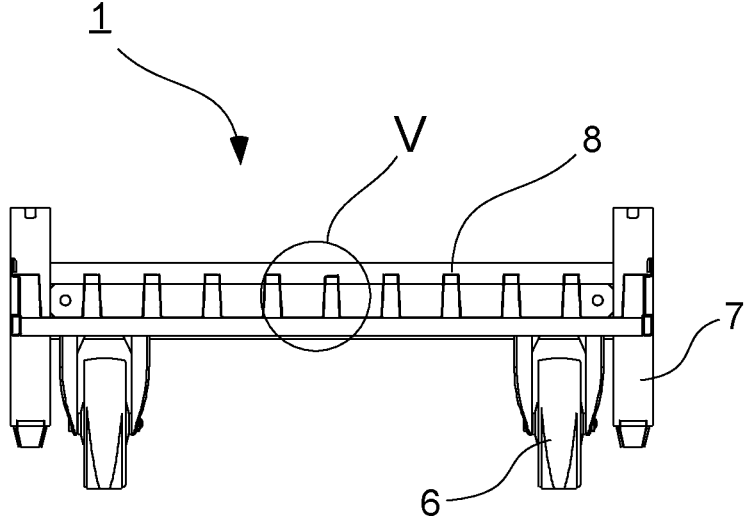
FIG. 3 illustrates a cutaway view of a base frame of the load carrier of FIG. 1, shown in section III-III.
Figure 4:
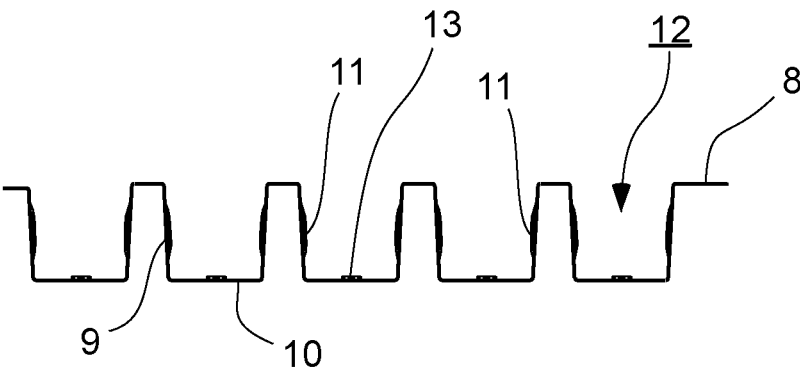
FIG. 4 illustrates a slightly enlarged end view of a member of a base frame, the member having a plurality of channels, in accordance with one embodiment.
Figure 7:
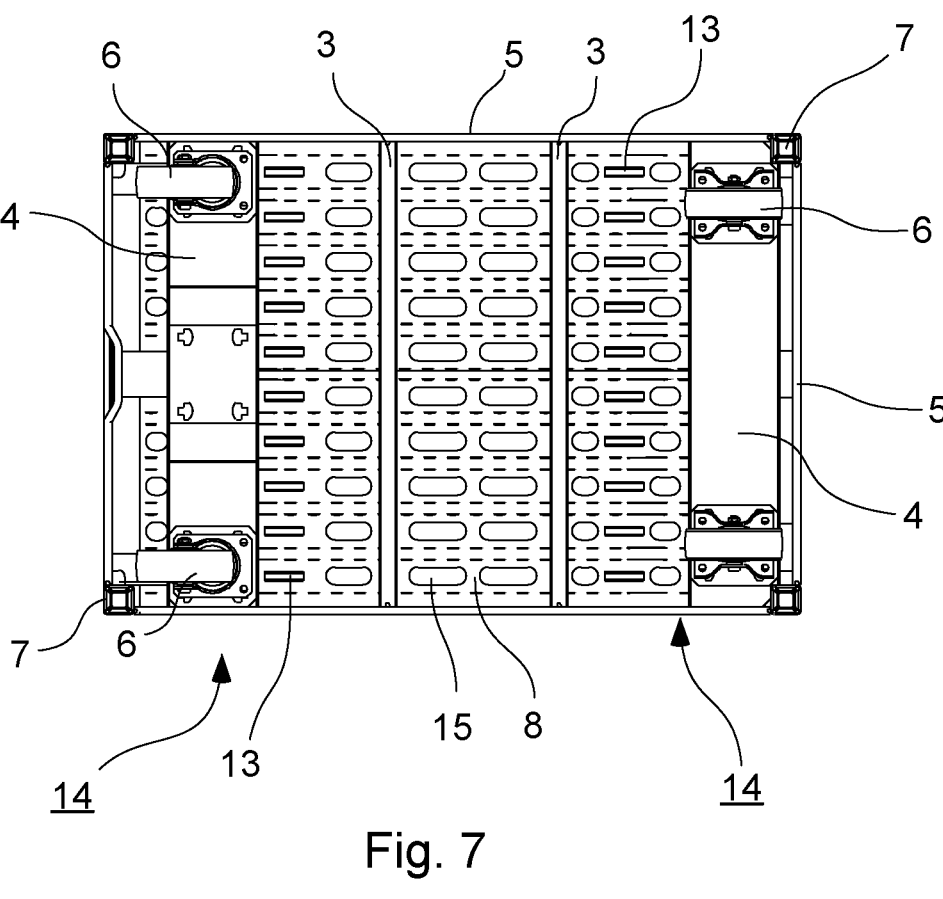
FIG. 7 illustrates a bottom view of a base frame of a load carrier, in accordance with one embodiment.
Figure 8:
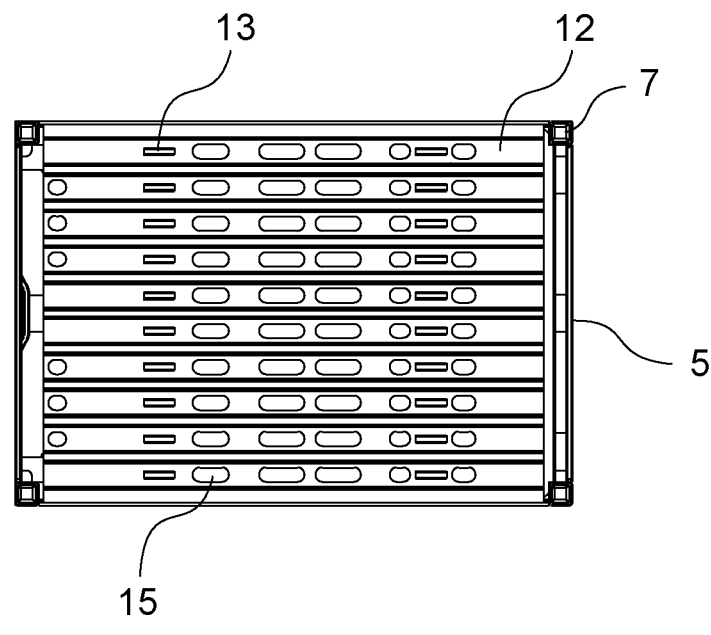
FIG. 8 illustrates a top view of a base frame of a load carrier wherein the channels travel longitudinally, in accordance with one embodiment.
Figure 9:
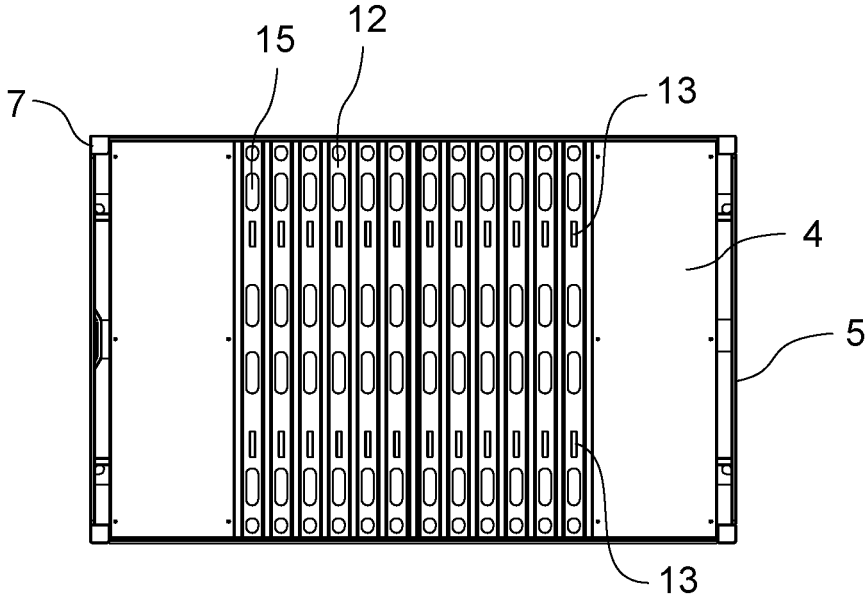
FIG. 9 illustrates a top view of a base frame of a load carrier wherein the channels travel transversely, in accordance with one embodiment.

A set of side protuberances 11 and/or protrusions 13 can be arranged in an end area 14 at both ends of the member 8. An end area 14 is to be understood as an area close to an end of the member 8 and is illustrated in, for example, FIGS. 1, 2, and 7.

The sides 9 and/or base 10 of the member 8 can be provided with openings 15. The opening 15 facilitate noise reduction. An additional benefit of such openings it a reduction in weight.

In one embodiment of the load carrier, the members 8 can have a trapezoid cross section.

In one embodiment of the load carrier, the members 8 can be positioned with their upwardly open channels 12 travelling in the longitudinal direction of the base frame 2.

In an alternative embodiment of the load carrier, the members 8 can be positioned with their upwardly open channels 12 travelling in the transverse direction of the base frame 2. In a rectangular load carrier, transverse orientation of the members 8 allows for a large number of members 8 versus longitudinal orientation of the members 8. However, the transversely oriented members 8 are shorter than longitudinally oriented members 8 and, therefore, column parts 20 for loading therein must be smaller. This gives shorter members than if they were placed longitudinally, which means that the column parts 20 that can be stored in the channels 12 of the members 8 will have to be shorter. That being said, in some embodiments, transverse orientation of the members 8 allows for more column parts 20 to be arranged next to each other than does longitudinal orientation of the members 8.

When placed in the connecting pieces 7, the columns 20 are intended for carrying a number of shelves (not shown). The columns 20 may therefore be provided with a number of notches or grooves (not shown) which may be spaced evenly apart from on another (equidistant). To ensure that a side protuberance 11 does not fit into such a groove, when the columns 20 are arranged in the channel 12 of a member 8, it is an advantage that the protuberances 11 in the sides 9 of the member 8 travel slantwise.

To prevent a base protrusion 13 in the base 10 of a member 8 from fitting into a groove in the column 20, the base 10 of the member 8 can be provided with more than two protrusions 13.

Figure 10:
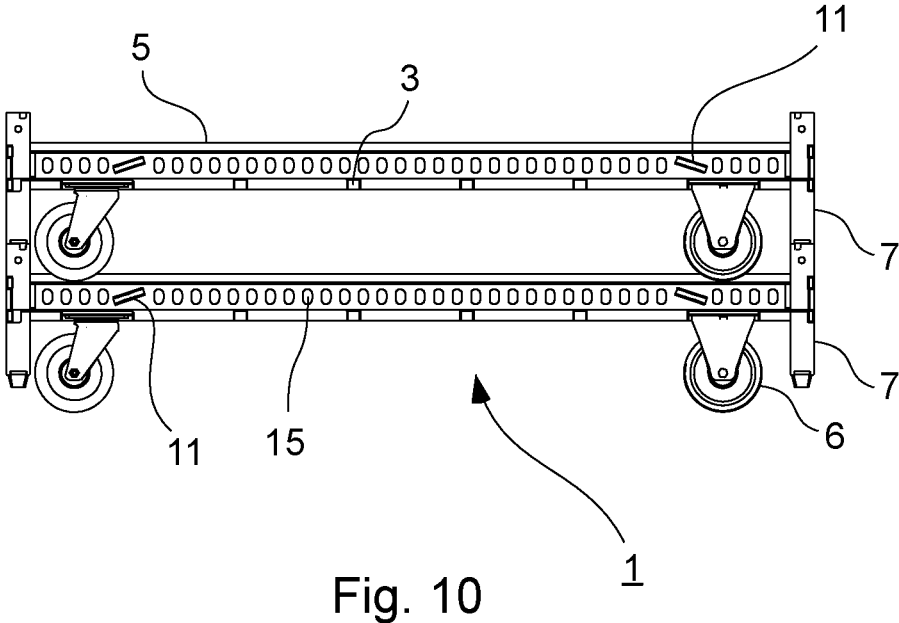
FIG. 10 illustrates a side view of two stacked base frames for load carriers; in accordance with one embodiment.

As shown in FIG. 10, a plurality of load carriers 1 can be stacked on top of each other on return. Here the connecting pieces 7 of a top load carrier may be aligned with the connecting pieces 7 of a bottom load carrier, for example at corners of the load carriers 1. When the load carriers 1 are transported while carrying products, for example for distribution, stacking can also take place. Here columns (not shown in FIG. 10) mounted in the connecting pieces 7 in the corners will establish a distance between an upper and a lower load carrier 1. Several load carriers 1 can be stacked on top of each other separated in the height by column parts, wherein the total height is determined by the cargo compartment, in which the load carriers 1 are to be transported.

In one embodiment, shelves for receipt by the columns 20 can be stacked on top of each other and arranged on the load carrier supported or delimited by the corner connecting pieces 7.

Thus, the members 8 constitute storage facilities for storage of columns or column parts 20, wherein it is possible to store a number of columns 20, both when the load carrier 1 is returned after use and for storing a number of surplus columns 20 not in use. Thereby it is possible to store additional column parts 20 in the members during use of the load carrier 1.

Various lengths of column parts 20 may be used with load carriers as discussed herein. For example, the column parts 20 may be shorter than a length of the members 8, thereby ensuring that the column parts 20 do not project beyond the base frame 2 of the load carrier 1.

An aspect or an advantage described in connection with a certain embodiment is not necessarily limited to this embodiment and can be put into practice in other embodiments even if they are not so illustrated of if they are not so explicitly described.

The invention claimed is:

1. A load carrier comprising;
a base frame having a plurality of support bars surrounded by a frame portion;
at least two sets of wheels coupled to a bottom face of the base frame; and
at least one connecting piece for receiving a column for use of the load carrier; and
a plurality of members coupled to the support bars, each of the members comprising an upwardly open channel having sides and a base, and a side protrusion on at least one of the sides of the member, wherein the side protrusion extends into the upwardly open channel of the member.

2. The load carrier of claim 1, further comprising a base protrusion formed on and rising from the base of the channel of the member.

3. The load carrier of claim 2, further comprising a side protrusion on at least one of the sides of the member, wherein the side protrusion extends into the upwardly open channel of the member, and wherein the base protrusion extends to a level even with a bottom end of the side protrusion.

4. The load carrier of claim 1, further comprising openings in the sides and/or the base of the member.

5. The load carrier of claim 1, wherein the members have a trapezoid cross section.

6. The load carrier of claim 1, wherein the members are placed with the upwardly open channels travelling in a longitudinal direction of the base frame.

7. The load carrier of claim 1, wherein the members are placed with the upwardly open channels travelling in a transverse direction of the base frame.

8. The load carrier of claim 1, wherein the base frame is rectangular and has four corners.

9. The load carrier of claim 8, wherein a connecting piece is provided at each of the four corners.

10. The load carrier of claim 1, wherein the members are substantially U-shaped.

11. The load carrier of claim 1, wherein the support bars are longitudinal support bars.

12. The load carrier of claim 1, wherein the support bars are transverse support bars.

13. The load carrier of claim 1, wherein the base frame further comprises at least one plate portion.

14. A load carrier comprising;
a base frame having a plurality of support bars surrounded by a frame portion;
at least two sets of wheels coupled to a bottom face of the base frame; and
at least one connecting piece for receiving a column for use of the load carrier; and
a plurality of members coupled to the support bars, each of the members comprising an upwardly open channel having sides and a base; and
pairs of side protrusions on sides of the members, wherein the pairs of side protrusions are arranged substantially opposite one another, and wherein the protrusions are arranged travelling slantwise such that a lower end of each of the protrusions is closer to an end of the member than an upper end of each of the protrusions.

15. A load carrier comprising;
a rectangular base frame having a plurality of support bars surrounded by a frame portion;
at least two sets of wheels coupled to a bottom face of the base frame; and
at least one connecting piece for receiving a column for use of the load carrier; and
a plurality of substantially U-shaped members coupled to the support bars, each of the members comprising an upwardly open channel having sides and a base, at least one pair of side protrusions on each side of the members, and at least one base protrusion extending upwardly from the base.

16. The load carrier of claim 15, wherein a pair of side protrusions is arranged at an end area at each end of the member.

* * * * *